United States Patent [19]

Hainke et al.

[11] 4,408,937

[45] Oct. 11, 1983

[54] ANCHOR BOLT

[75] Inventors: Volker Hainke, Lilienthalstrasse 16, 4800 Bielefeld 11; Hans U. Hainke, Bielefeld, both of Fed. Rep. of Germany

[73] Assignee: Hainke Volker, Bielefeld, Fed. Rep. of Germany

[21] Appl. No.: 343,808

[22] Filed: Jan. 29, 1982

Related U.S. Application Data

[63] Continuation of Ser. No. 108,884, Dec. 31, 1979, abandoned.

[51] Int. Cl.³ .............................................. F16B 13/06
[52] U.S. Cl. ......................................... 411/42; 411/57
[58] Field of Search ....................... 411/42, 39, 57, 58, 411/44, 24, 15, 26, 56, 54

[56] References Cited

U.S. PATENT DOCUMENTS 626,040  5/1899  Rowlands .............................. 411/54
2,887,694  5/1959  Sauter .............................. 411/501 X

FOREIGN PATENT DOCUMENTS 2556019  6/1977  Fed. Rep. of Germany ........ 411/57
  68764  1/1930  Sweden .............................. 411/42
 335508  9/1930  United Kingdom ................. 411/57
 725291  3/1955  United Kingdom ................. 411/57

*Primary Examiner*—Ramon S. Britts
*Attorney, Agent, or Firm*—Pollock, Vande Sande & Priddy

[57] ABSTRACT

An anchor bolt comprising a tension rod with a male screw-threaded section and a frusto-conical head terminating in a cylindrical shank, in combination with a sleeve having a female screw-threaded section and an internal frusto-conical bore. The sleeve has a polygonal cross-section with axially parallel pre-weakened rupture lines, permitting the sleeve to spread as it is entered by the tension rod, forcing the corners of the polygon into the surrounding material.

6 Claims, 4 Drawing Figures

ANCHOR BOLT

This is a continuation of application Ser. No. 108,884, filed Dec. 31, 1979, now abandoned.

DESCRIPTION

The invention relates to an anchor bolt for anchorage in a bore, with a tension rod which exhibits a screw-threaded cross-section and a head section conically enlarged from the latter, also having a sleeve with a female screw-threaded section and an adjacent sectorally spreadable anchorage section.

Anchor bolts of this type are known. They exhibit a sleeve, the anchorage section of which is constituted by a hollow cylinder of circular cross-section provided with axially parallel slits. The screw-threaded section of the tension rod is screwed into the female screw-thread of the sleeve from the side of the anchorage section, and the two are introduced as a unit into a bore. The tension rod is then further rotated until it urges the spreadable anchorage cross-section of the sleeve apart by its conical head section and thus anchors the sleeve in the surrounding material, such as timber, chipboards or concrete.

The disadvantage of the conventional anchor bolt mentioned lies in the fact that there is a risk that, when the tension rod is tightened, the sleeve may follow its rotation in the bore, so that the sleeve cannot be spread and therefore does not become anchored.

Attempts have been made to provide the surface of the sleeve with a corrugation, but even this corrugation has not always led to the desired result.

Furthermore, a sleeve of circular cross-section has the disadvantage that the spread circular arcuate segments have sharp corners and edges, resulting in anchorage in the material only to a small degree.

It is therefore the object of the invention to construct an anchor bolt of the type described hereinabove in such a way that it permits immediate, secure and durable anchorage in the material.

This object is achieved by providing an anchor bolt of the type described with a polygonal cross-section and axially parallel pre-weakened spreading lines in the median region of the sides of the polygon.

The polygonal, preferably hexagonal, cross-section of the sleeve reliably prevents the sleeve from following the rotation when the tension rod is tensioned. Furthermore, the polygonal cross-sectional shape produces a number of additional sharp corners on the spreadable side of the sleeve which facilitate entry into and locking in the material.

According to the preferred embodiment of the invention the sleeve exhibits in its spreadable anchorage cross-section, starting from the screw-threaded section, a flat conical enlargement which co-operates with the conical head section of the tension rod. The two conical surfaces together permit a soft uniform spreading of the sleeve by a small exertion of force, in this way also reducing the risk of the sleeve following the rotation of the tension rod or being withdrawn before anchorage is achieved.

Grooves, which may have a vee-shaped cross-section, are preferably provided in the axially parallel median lines of the surfaces of the polygon. It is convenient to co-ordinate the depth of the grooves and the course of the conical enlargement in the interior of the anchorage section of the sleeve, so that the two converge substantially at the free edge of the sleeve, permitting immediate tearing open and spreading of the sleeve there.

The tension rod, which is known as such, may be of such construction that the conically enlarged head section constitutes a smooth cylindrical shank, at the end of which an enlargement in the form of a slot-screw or female hexagonal screw head is provided.

The sleeve may consist of various kinds of plastic or metals and particularly may be an aluminum injection die-casting.

In order that the invention may be more clearly understood, reference will now be made to the accompanying drawing, wherein.

Figure 1:
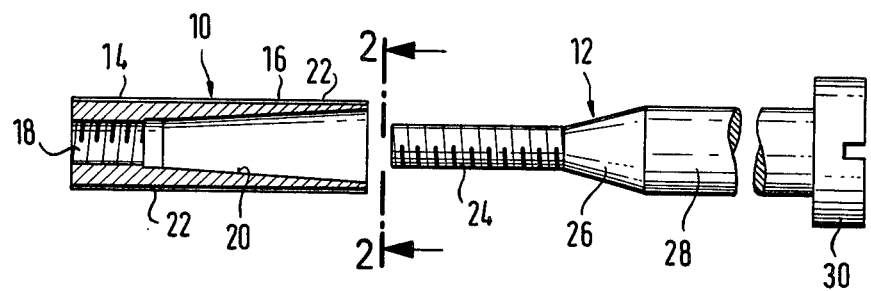
FIG. 1 shows a partial section of an arrangement of tension rod and sleeve before assembly.

In FIG. 1, a sleeve is designated 10 and a tension rod 12. The sleeve is constituted, in the longitudinal direction, by two sections, which are designated as a female screw-threaded section 14 on the left-hand side in FIG. 1 and as a spreadable anchorage section 16 on the right-hand side in FIG. 1. The female screw-threaded section 14 has a concentric axial bore 18 with female screw-thread. The anchorage section 16 is provided internally with a bore 20 which widens conically towards the free end to the right in FIG. 1. The cone angle of this bore 20 is comparatively small, e.g., 3° to 4° with respect to the longitudinal median line of the sleeve. As FIG. 2 clearly shows, the circumference of the sleeve 10 is of hexagonal cross-section. Grooves 22, which may have, e.g., a vee-shaped cross-section, are provided in the longitudinal median lines of the six planar surfaces on the exterior of the sleeve.

The enlargement of the bore 20 and the depth of the grooves 22 are mutually co-ordinated in such a way that they converge substantially at the right-hand end of the sleeve in FIG. 1, or at least are separated by a very slight thickness of material which can immediately be ruptured.

The tension rod shown on the right-hand side in FIG. 1 comprises a screw-threaded section 24 provided with a male screw-thread and a frusto-conical head section 26 adjoining the same. The male screw-thread of the screw-threaded section 24 corresponds to the female screw-thread of the bore 18. The frusto-conical head section 26 need not necessarily exhibit a precise by conical surface, but may also be bevelled or rounded in a different manner. The head section 26 in the example illustrated merges into a cylindrical shank 28 of any desired length and a head 30 adjoining the latter for the application of a screwdriver or female hexagon key. However, other elements which permit rotation and bracing of the tension rod 12 to the left in FIG. 1 may be provided instead of the shank 28 and the head 30.

During assembly of the anchor bolt according to the invention, the screw-threaded section 24 is first passed through the anchorage section 16 and screwed into the bore 18 until, e.g., the conical head section 12 in loose contact with the right-hand end of the sleeve. In this position the sleeve and the tension rod are introduced as a unit into a bore, which may be, e.g., a bore in a concrete wall or in components made of timber or chipboard. Box-shaped furniture items may be assembled, e.g., by making blind holes in a board from each of its edges, and drilling countersunk holes for the head 30 in associated positions of rectangularly adjacent boards. These assembly possibilities are known per se and will therefore not be explained in detail.

Figure 2:
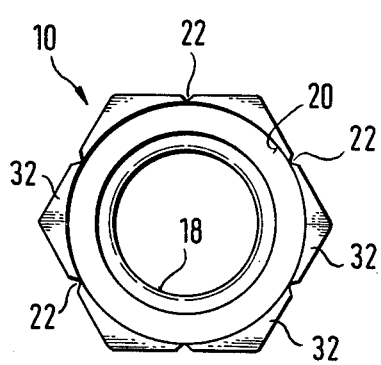
FIG. 2 is a larger scale elevation of the sleeve along the line 2—2 in FIG. 1.
Figure 4:
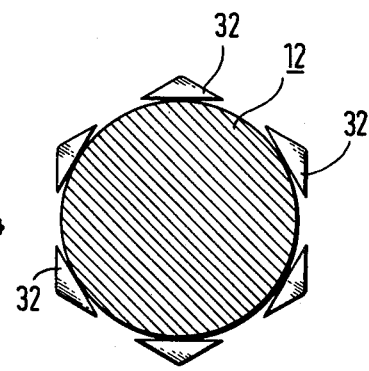
FIG. 4 is an elevation along the line 4—4 in FIG. 3.
Figure 3:
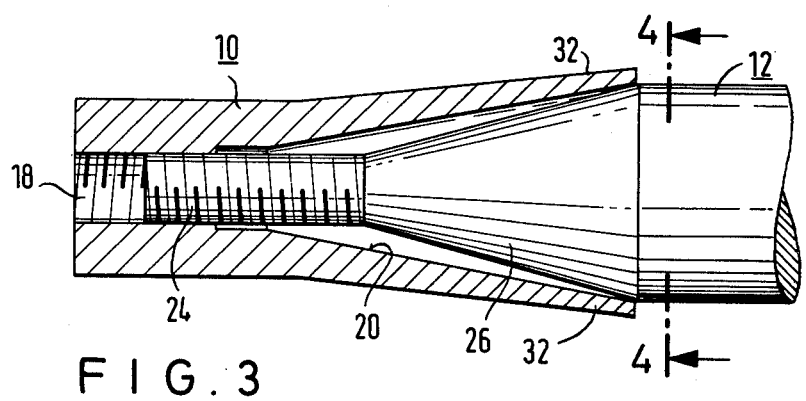
FIG. 3 is a partial section of the anchor bolt during tensioning.

The unit comprising sleeve 10 and tension rod 12 is introduced into the hole until the head 30 abuts against a suitable stop, e.g., the bottom of a sunk hole. When the tension rod 12 is further rotated in this position, the sleeve 10 is attracted due to the screw-thread engagement between the screw-threaded section 24 and is the bore 18 and simultaneously spread, as shown in FIG. 3. During this spreading the anchorage section 16 tears open in the region of the grooves 22 (FIG. 2) into individual segments 32 (FIG. 2). These segments penetrate increasingly into the material of the adjacent wall of the bore, so that the sleeve becomes anchored in the bore. The position of FIG. 4 is then substantially obtained.

The cross-sectional shape of the sleeve 10 according to the invention not only has the advantage that rotation of the sleeve during the tensioning operation is precluded. On the contrary, FIG. 4 clearly shows that the individual segments 32 constitute a larger number of sharp corners than is the case say, of cylindrical spreadable sleeves. Said sharp corners facilitate the penetration into the material of the bore wall and hence the anchorage of the sleeve.

The anchor bolt according to the invention makes possible, for example, a corner joint of box-shaped furniture items without fitting parts being visible on the external surface of the individual boards, with the exception of the head 30 let into a sunk bore, which can however if desired be used as a decorative element.

After anchorage, the sleeve 10 attains a fixed seat in the associated bore, which seat is retained even if the tension rod 12 is unscrewed in order to release the joint and possibly screwed back in again afterwards.

What is claimed is:
1. An anchor bolt for anchorage in a bore, comprising
    (a) a tension rod having a male screw-threaded portion terminating in a frusto-conical head portion diverging therefrom at a first angle of conicity; and
    (b) a sleeve of polygonal cross-section having a female screw-threaded portion for engagement with said male screw-threaded portion of said tension rod, said female screw-threaded portion terminating in a frusto-conical bore diverging therefrom at a second angle of conicity less than said first angle, for engagement with said head portion of said tension rod;
    (c) axially parallel grooves being provided in the polygonal sides of said sleeve so as to define outwardly cornered segments therebetween, the conicity of said frusto-conical bore and the depth of said grooves being so selected that they converge to a substantial degree at the end of said bore remote from said female screw-threaded portion, whereby, upon engagement of said head portion against said bore, said segments are forced arcuately outwardly by sequential tearing of said grooves from the trailing end to the leading end of said sleeve.

2. An anchor bolt as claimed in claim 1, wherein the cross-section of said sleeve is hexagonal.

3. An anchor bolt as claimed in claim 1, wherein said grooves have substantially vee-shaped cross-sections.

4. An anchor bolt as claimed in claim 1, wherein said grooves are provided in the median region of each of said polygonal sides of the said sleeve.

5. An anchor bolt as claimed in claim 1, wherein said grooves extend along the entire length of said sleeve.

6. An anchor bolt as claimed in any one of the preceeding claims, wherein said sleeve is an aluminum injection die-casting.

* * * * *